Dec. 6, 1960  J. HEZLER, JR  2,962,933
REMOTELY CONTROLLED MIRROR
Filed March 26, 1958  2 Sheets-Sheet 1
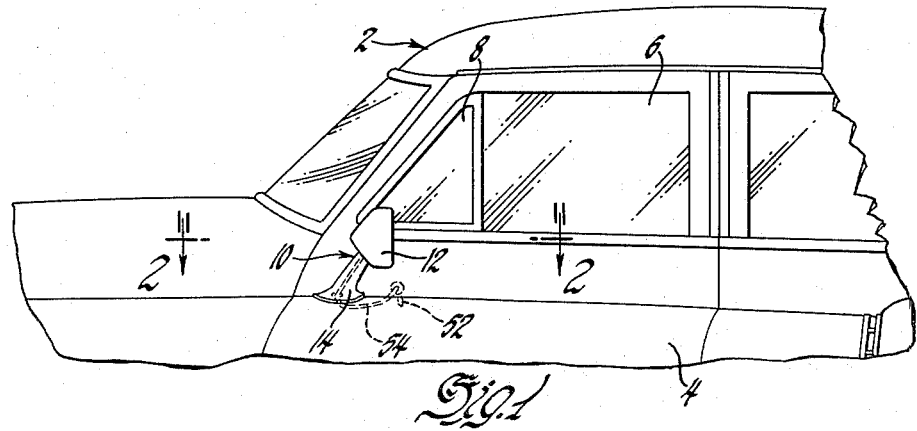
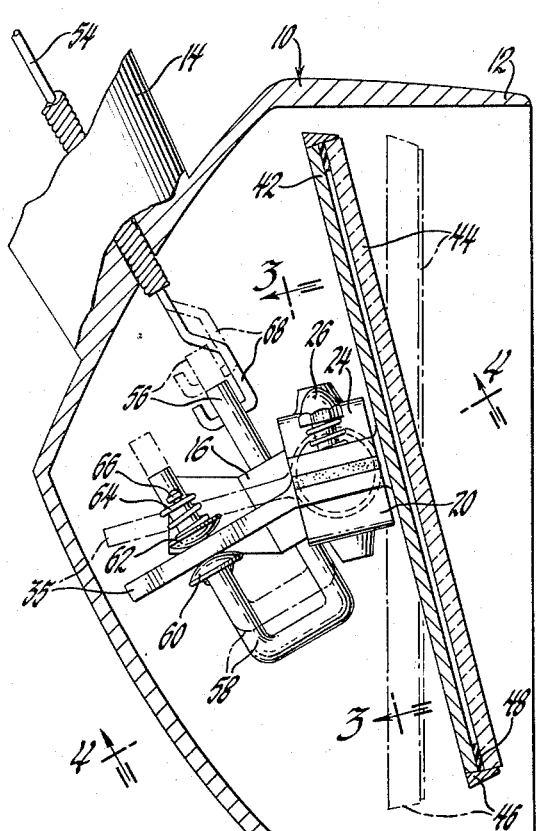
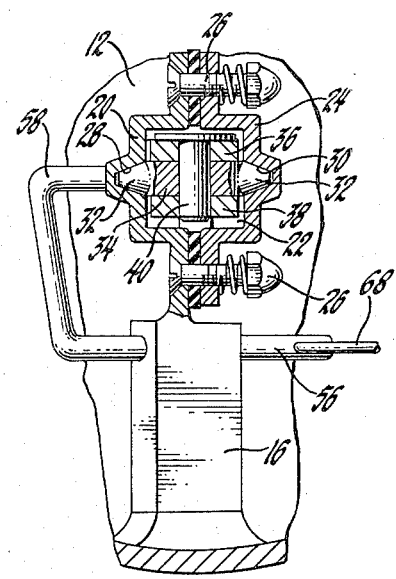
INVENTOR.
Julius Hezler, Jr.
BY R. F. Barnard
ATTORNEY Dec. 6, 1960  J. HEZLER, JR  2,962,933
REMOTELY CONTROLLED MIRROR
Filed March 26, 1958  2 Sheets-Sheet 2
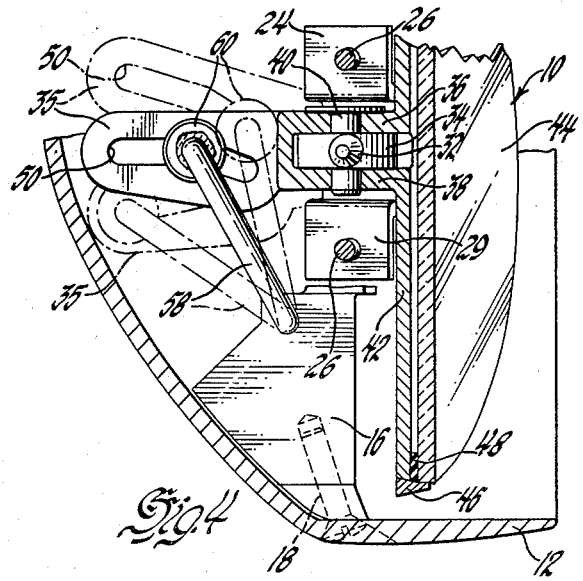
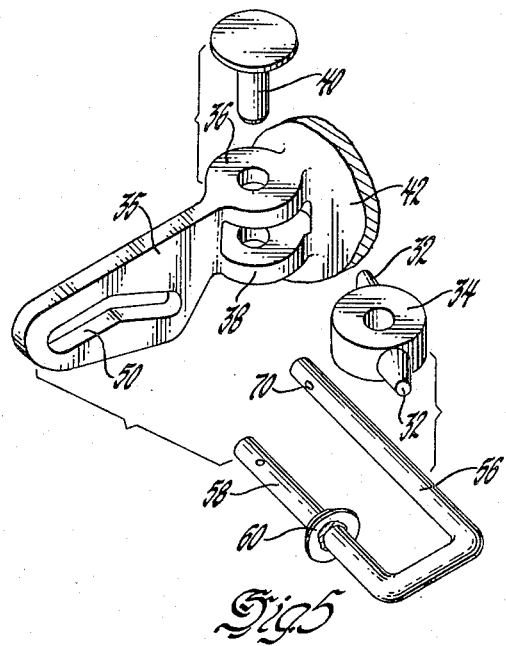
INVENTOR.
Julius Hezler, Jr.
BY
R. T. Barnard
ATTORNEY United States Patent Office 2,962,933
Patented Dec. 6, 1960

2,962,933

REMOTELY CONTROLLED MIRROR

Julius Hezler, Jr., Detroit, Mich., assignor to General Motors Corporation, Detroit, Mich., a corporation of Delaware Filed Mar. 26, 1958, Ser. No. 724,080

6 Claims. (Cl. 88—93)

The present invention relates generally to rear view mirrors and, more particularly, to a mirror mechanism adapted to be mounted exteriorly of an automotive vehicle and including means for remotely controlling the position of the mirror from within the vehicle.

Remotely controlled rear view mirrors of the general type herein contemplated have normally comprised a mirror assembly including a ball joint for swivelly mounting the assembly on an exterior body panel of a vehicle. Such an assembly also usually includes some type of remote actuating mechanism including an actuator disposed interiorly of the vehicle adjacent the vehicle operator and operatively connected to the aforementioned mirror assembly for pivoting the latter about its ball joint mounting as desired by the vehicle operator to obtain proper rear vision. Generally speaking, such prior mirror constructions have been found to be quite advantageous in providing a means permitting the vehicle operator to remotely position the exteriorly mounted mirror assembly without exposing himself to inclement weather, and in providing a means of mirror adjustment without the inconvenience of rolling down a vehicle window and manually grasping the mirror to adjust the latter.

However, in mirrors of the type aforedescribed which include a ball joint mounting, it will be readily appreciated that the vehicle operator in making its adjustment must employ a certain degree of manual dexterity inasmuch as the mirror assembly is free to move in an infinite number of planes about its mounting joint. As a practical matter, such a completely and freely adjustable ball joint mounting is not necessary in modern rear view mirror assemblies. In actual practice, if the mirror assembly is once adjusted to a preselected position and is not accidentally or otherwise dislodged from its preselected position to a great extent, only relatively fine adjustments of the mirror assembly are required from time to time to suit the needs of the vehicle operator. Moreover, the aforementioned ball and socket mirror mounting in particular is quite susceptible of being dislodged from its preselected position, not only by reason of being accidentally struck, but due to vehicle vibration and the rapid flow of air past the vehicle while the latter is in motion.

It is, therefore, a general object and feature of this invention to provide a remotely controlled mirror mechanism in which a novel type of mounting and control joint is provided for supporting the mirror assembly exteriorly of the vehicle whereby the mirror may be easily and rapidly adjusted.

More specifically, it is an object and feature of this invention to provide a mirror mechanism including a control joint having control members providing mirror adjustment about two distinct axes which are preferably at right angles to each other.

It is yet a more specific object of this invention to provide a control joint of the type aforementioned which, while being capable of providing rapid adjustment and selection of mirror position, will effectively resist disruption of a selected position thereof.

Another object attained by this invention is the provision of a remotely controlled mirror mechanism in which the remotely located mirror assembly and actuator therefor form simple, inexpensive sub-assemblies which particularly result in reduction of installation time and increased handling efficiency.

In general, these and other objects of this invention are obtained by providing a mirror mechanism adapted to be mounted exteriorly of a vehicle passenger compartment and selectively positioned remotely from within said compartment, this mechanism comprising a control arm having a mirror mounted at one end thereof and a bifurcated intermediate portion embracing a disc or wafer-like control member. The control member includes laterally, oppositely projecting tapered pin portions suitably seated in pivot seats within a control joint housing whereby the control arm and the control member may be pivoted relative to the housing. Still further, the bifurcated portion of the control arm is pivotally pinned to the control member whereby the control arm may be pivoted relative to the control member and the control joint housing. Preferably, the first-named pivot axis defined by the pivotal mounting of the control member to the control housing, and the second-named pivot axis defined by the pivotal connection of the control arm to the disc-shaped control member are at right angles to each other to provide a broad range of mirror movement. The remote operating mechanism for the aforedescribed mirror mechanism includes an actuator disposed within the vehicle compartment and operatively connected to a substantially U-shaped control rod journalled in the exterior mirror support and having a leg thereof passing through the end of the control arm opposite the point of attachment of the latter to the mirror. The actuator may be rotated to pivot the mirror assembly about the aforedescribed first axis of the control joint, or reciprocated with a push-pull action to pivot the mirror assembly about the aforedescribed second axis of the control joint.

The structure of this invention which attains the foregoing and other objects will become more apparent hereinafter as the description of the invention proceeds, and in which reference is made to the following drawings in which:

Figure 1 is a fragmentary side elevation of an automotive vehicle equipped with the mirror mechanism of this invention;

Figure 2 is an enlarged cross sectional view taken on line 2—2 of Figure 1;

Figure 3 is a fragmentary cross sectional view taken on line 3—3 of Figure 2;

Figure 4 is a fragmentary cross sectional view taken on line 4—4 of Figure 2; and Figure 5 is an exploded perspective view showing various details of the structure.

In Figure 1, an automotive vehicle is indicated generally at 2, and comprises a left front door panel 4 in which the window 6 and ventilating window 8 are disposed in a conventional manner. The mirror mechanism 10 of this invention is shown as being mounted on the exterior side wall of the door panel 4, although it will be apparent as the description of the invention proceeds that it may be located in other positions exteriorly of the passenger compartment such as on a vehicle fender.

Referring now to Figures 2 through 5 inclusive, the mirror mechanism 10 may be seen to include a cup-shaped or shell-like shroud or housing 12 formed integrally with or otherwise suitably supported on a bracket 14 secured to the vehicle door panel 4. A mirror support pedestal 16 is formed integral with, or is suitably supported from, the inner wall of the housing 12 such as by the set screw 18 shown in phantom in Figure 4. Projecting upwardly from the pedestal 16 is an extension which includes an intermediate outwardly projecting wall portion 20 forming a part of a control joint housing 22. The other wall 24 of the control joint housing is formed from a similarly shaped plate having end portions adapted to be locked to the similar end portions of the pedestal extension by means of a pair of screw and nut assemblies indicated at 26.

It will be noted that the diametrically opposite intermediate walls 20 and 24 forming the control joint housing 22 include substantially frusto-conically tapered depressions 28 and 30, respectively, which are adapted to receive similarly tapered pins 32 formed diametrically opposite from each other on a disc or wafer-like support member 34. A control arm 35 has formed intermediate thereof a bifurcated portion comprising the upper and lower substantially circularly shaped plates 36 and 38, respectively, each of which include an aperture therethrough aligned with an aperture in the support member 34 to receive pivot pin 40.

The spaced plates 36 and 38 are formed integral with or otherwise suitably secured at one end to a mirror backing 42 in which a reflecting mirror element 44 is adapted to be secured in any suitable manner as by means of the bezel or door 46. Preferably, an annular gasket 48 is seated between the mirror element 44 and its backing 42 about the peripheral portion of the assembly. The other end of the control arm 35 is provided with a longitudinally extending elongate slot 50 which, in this instance, is generally arcuate in shape for a purpose to appear more fully hereinafter.

From the foregoing description, it will be apparent that the mirror element and its control arm 35 are supported on the pedestal 16 by means of a control joint within the control joint housing 22, which joint includes the disc-like support member 34 pivotally mounted relative to the control joint housing on a first pivot axis defined by the pin-like projections 32, while the control arm is pivotally mounted relative to the support member 34 and the joint housing about the axis of pin 40.

The operating mechanism for remotely selectively positioning the mirror element 44 includes a suitable manually operable actuator 52 mounted within the vehicle compartment as shown in Figure 1, and suitable means such as a Bowden wire 54 operatively connecting the actuator to a substantially U-shaped control rod having one leg 56 thereof reciprocally and pivotally disposed in a suitable bushing extending through the wall of the pedestal 16. The other leg 58 of the control rod extends transversely through the elongate slot 50 in the control arm 35 and includes means such as the spherically shaped washers 60 and 62 to prevent relative transverse movement between the control rod and the elongate slot in the control arm. The washer 60 may be welded or otherwise secured to the leg 58 of the control rod, while it is convenient particularly for assembly purposes to removably yieldably slidably mount the other washer 62 on the free end of the control rod by means of a spring 64 locked to the leg 58 of the control rod by a suitable key or pin 66. The bowden wire 54 is formed with a hook end 68 which passes through a suitably formed aperture 70 in the leg 56 of the control rod so as to secure the latter operatively to the actuator 52.

At this juncture, it should be obvious that remote control means other than a Bowden wire mechanism may be utilized to selectively position the mirror element 44. For example, a mechanical linkage or single link or operating rod may operatively interconnect the actuator 52 and the control rod to provide reciprocating and pivotal movement for the latter. However, in most instances, a flexible type of connection such as a Bowden wire or cable will be preferable inasmuch as it may be used quite conveniently in installations which, due to space limitations or configuration of various body panels, will not permit the use of other equivalents thereof as suggested above.

In operation, the vehicle operator may rotate the actuator 52 thereby causing rotation of the leg 56 of the control rod within its bushing in the pedestal 16. At this time, the leg 58 of the control rod will ride forwardly or rearwardly within the elongate slot 50 in the control arm 35 causing the latter and the support member 34 to pivot about a first axis defined by the pins 32 to adjust the mirror element 44 in a vertical plane as indicated in dotted lines in Figure 4. On the other hand, the actuator 52 may be pushed or pulled as required to cause reciprocation of the control rod within its bushing in the pedestal 16 which will cause the washers 60, 62 to act against the control arm 35 to pivot the latter about the axis of the pin 40 to adjust the mirror assembly in a horizontal plane.

Thus, the mirror and its operating mechanism herein disclosed includes an external mirror support including a universal type of control joint which permits mirror adjustment about two distinct and easily selectable axes. In view of the fact that, under ordinary circumstances, a mirror assembly of this type when once adjusted will require only minor subsequent adjustments, the aforedisclosed mirror mechanism provides a very simple, efficient and effective means of readily adjusting a misaligned mirror by reason of providing two distinct mirror adjustment axes as compared to prior types of mirror mechanisms in which the mirror was mounted upon a ball joint having an infinite number of adjustment axes. Moreover, with the novel type of control joint herein disclosed, the mirror assembly is less susceptible to becoming dislodged from its preselected position by reason of air flow past the vehicle or by reason of being accidentally struck by some foreign body.

As aforementioned, the slot 50 in the mirror control arm is substantially arcuate or curved in configuration. In this regard, it will be observed that the portion of the control rod connecting its legs 56 and 58 must be of sufficient length so as to be able to rotate the mirror assembly about the axis of the pins 32 through a relatively great degree of movement as is indicated in dotted lines in Figure 4. It will be appreciated that, inasmuch as the control rod has its leg 56 pivotally disposed in the pedestal 16 at a point below the longitudinal center line of the control arm 35 below the axis of the pivot pins 32, if the leg 58 of the control rod merely projected through a circular aperture in the control arm that a very small degree of movement would be provided for the control arm. Therefore, the slot 50 is provided in the control arm to permit a great range of movement of the latter and, consequently, the mirror 44. Moreover, the forward portion of the slot 50 is curved or projected downwardly to provide an additional increment of mirror movement as it is moved from the lower dotted line position to the upper dotted line position of Figure 4. It will be obvious, however, that the slot 50 could be replaced by a circular aperture in a particular mirror assembly in which the control rod might be mounted so as to lie in a plane substantially through the longitudinal center line of the control arm 35 and pivot pins 32. Moreover, even in installations in which the control rod is disposed substantially as shown, the slot may be given other shapes to provide any type of mirror action desired when pivoting the latter in a vertical plane.

Having disclosed a preferred embodiment of this invention, it is to be understood that such disclosure is for illustrative purposes only and in no way is intended to limit the scope of this invention which is defined by the claims which follow.

I claim:

1. A remotely controlled mirror mechanism adapted to be mounted exteriorly of a vehicle passenger compartment and selectively positioned remotely from within said compartment, said mechanism comprising a mirror support secured to the exterior of said vehicle, a mirror control joint comprising a support member, means pivotally connecting said support member to said mirror support for movement about a first axis, a control arm secured to a mirror, means pivotally connecting said control arm to said support member for movement about a second axis intersecting said first axis, and control means within said vehicle compartment operatively connected to said control arm at a point spaced from said axes, said control means being operable in one direction to pivot said control arm and support member about said first axis, and being operable in another direction to pivot said control arm relative to said support member about said second axis.

2. A remotely controlled mirror mechanism adapted to be mounted exteriorly of a vehicle passenger compartment and selectively positioned remotely from within said compartment, said mechanism comprising a mirror support secured to the exterior of said vehicle, a mirror control joint comprising a support member, means pivotally connecting said support member to said mirror support for movement about a first axis, a control arm secured to a mirror, means pivotally connecting said control arm to said support member for movement about a second axis, and control means within said vehicle compartment operatively connected to said control arm at a point spaced from said axes, said control means being operable in one direction to pivot said control arm and support member about said first axis, and being operable in another direction to pivot said control arm relative to said support member about said second axis.

3. A remotely controlled mirror mechanism adapted to be mounted exteriorly of a vehicle passenger compartment and selectively positioned remotely from within said compartment, said mechanism comprising a mirror support including a control joint housing, a support member, means pivotally mounting said support member within said housing for movement about a first axis, a control arm extending through said housing and having an intermediate bifurcated portion embracing said support member, means pivotally connecting said intermediate portion of said control arm to said support member for movement about a second axis, a mirror secured to one end of said control arm, and an operating mechanism operatively connected to the other end of said control arm and including an actuator mounted within said compartment, said actuator being operable to selectively pivot said control arm about said first and second axis.

4. A remotely controlled mirror mechanism adapted to be mounted exteriorly of a vehicle passenger compartment and selectively positioned remotely from within said compartment, said mechanism comprising a mirror support including a control joint housing, a disc-shaped support member, means pivotally mounting said support member within said housing for movement about a first axis, a control arm extending through said housing and having an intermediate bifurcated portion embracing said support member, means pivotally connecting the intermediate portion of said control arm to said support member for movement about a second axis, a mirror secured to one end of said control arm, and an operating mechanism including an actuator mounted within said compartment and an actuated member pivotally and reciprocably disposed within said mirror support, said actuated member being operatively connected to the other end of said control arm, said actuator being operable to selectively pivot and reciprocate said actuated member whereby said control arm may be pivoted about said first and second axis.

5. A remotely controlled mirror mechanism adapted to be mounted exteriorly of a vehicle passenger compartment and selectively positioned remotely from within said compartment, said mechanism comprising an exteriorly mounted mirror support, a control joint housing carried by said support, a pair of opposed pivot seats formed within said housing, a disc-shaped control member having oppositely extending pivot portions mounted on said housing pivot seats, a mirror control arm extending through said housing and having an intermediate bifurcated portion embracing said disc-shaped control member, a pin pivotally connecting said bifurcated portion of said control arm to said control member; a mirror secured to one end of said control arm, and a remote actuator disposed within said vehicle compartment and operatively connected to the other end of said control arm to selectively pivot the latter about the axis of said pivot seats and pin.

6. A remotely controlled mirror mechanism adapted to be mounted exteriorly of a vehicle passenger compartment and selectively positioned remotely from within said compartment, said mechanism comprising an exteriorly mounted mirror support, a control joint housing carried by said support, a pair of opposed pivot seats formed within said housing, a disc-shaped support member including oppositely extending pivot portions mounted on said housing pivot seats forming a first pivot axis, a mirror control arm extending through said housing and including an intermediate bifurcated portion embracing said disc-shaped support member, a pin pivotally connecting said bifurcated portion of said control arm to said support member for movement relative thereto and to said control joint housing about a second axis, a mirror secured to one end of said control arm, an elongate slot formed in the other end of said control arm, a substantially U-shaped control rod having one leg thereof reciprocably and pivotally mounted on said mirror support, the other leg of said control rod extending transversely through said control arm slot, means connecting said other leg of said control rod within said slot to prevent relative movement of said control rod transversely of said control arm while permitting relative movement of said control rod within said control arm slot longitudinally of the latter, and a remote actuator disposed within said vehicle compartment and operatively connected to said control rod to impart rotative and reciprocable movement to the latter selectively, whereby said control arm and support member may be pivoted relative to said housing about said first axis and said control arm may be pivoted relative to said support member and housing about said second axis.

References Cited in the file of this patent

UNITED STATES PATENTS

| | | |
|---|---|---|
| 1,392,424 | Linstrom et al. | Oct. 4, 1921 |
| 1,444,896 | Young | Feb. 13, 1923 |
| 1,630,217 | Rasor | May 24, 1927 |
| 1,740,909 | Shaw | Dec. 24, 1929 |
| 2,456,362 | Aves | Dec. 14, 1948 |
| 2,472,438 | Price | June 7, 1949 |
| 2,573,127 | Von Bredow | Oct. 30, 1951 |
| 2,614,437 | Meggitt | Oct. 21, 1952 |
| 2,620,708 | Anderson | Dec. 9, 1952 |
| 2,632,363 | Persson | Mar. 24, 1953 |
| 2,696,142 | Langford | Dec. 7, 1954 |
| 2,734,997 | Frady | Feb. 14, 1956 |